June 7, 1932. P. K. DEVERS 1,862,358
METHOD AND APPARATUS FOR FUSING SILICA AND THE LIKE
Filed May 19, 1930
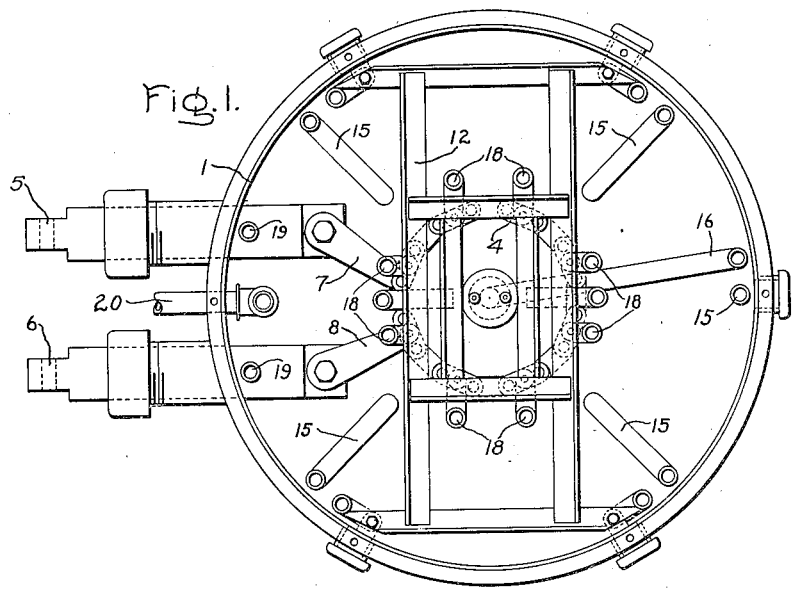
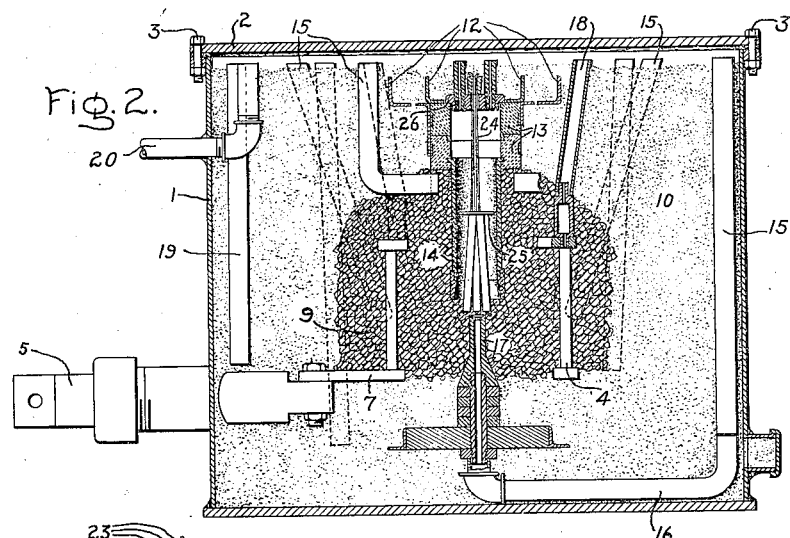
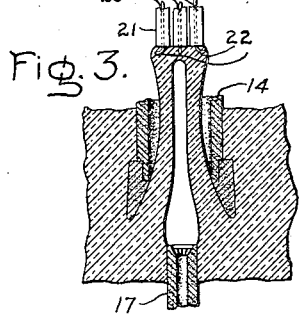
Inventor:
Philip K. Devers,
by Charles E. Mullo
His Attorney.

Patented June 7, 1932

1,862,358

UNITED STATES PATENT OFFICE

PHILIP K. DEVERS, OF LYNN, MASSACHUSETTS, ASSIGNOR TO GENERAL ELECTRIC COMPANY, A CORPORATION OF NEW YORK

METHOD AND APPARATUS FOR FUSING SILICA AND THE LIKE

Application filed May 19, 1930. Serial No. 453,515.

The present invention relates to the fabrication of articles, such for example as rods, tubes and sheets, of substantially clear, vitreous silica; and it is the object of my invention to provide a method and apparatus for making such a product from a native granular product, known as silica sand, and from other plentiful low grade crystalline masses of quartz which heretofore have been unavailable for this purpose.

For the production of clear, vitreous silica as heretofore carried out an expensive, high grade material has been utilized, ordinarily as large, clear crystalline masses imported from Brazil. These crystals in convenient fragments have been fused in a high vacuum, followed ordinarily by a pressure treatment. Fusion, even in vacuo, of the much more plentiful and cheaper form of native silica, known as "quartz sand", has heretofore yielded a more or less opaque product containing numerous trapped gas bubbles. To a lesser degree this is true also of the lower grade varieties of native crystalline quartz. When such a product has been drawn out into rods, tubes or other elongated objects, the elongation of the trapped bubbles has produced long capillary ducts or "pipes" in the product which rendered it unsuitable for many uses. If the quartz sand or granular silica is fused in vacuum, without the new features constituting my present invention (to be described presently), or if it has not been fused in vacuum at all, the "pipes" in the product may contain gas at, or nearly at, atmospheric pressure. The fused stock commonly is pulled out of the fusing furnace in the form of unfinished rods or tubing sometimes known as "the pull". The "pipes" present in large number in this "pull" stock become puffed up when subsequently fused due to the expansion of included gas. Their presence makes it difficult to work the tubing or rod stock as formerly made. It is often desirable to form some larger shaped vessel from tubing, as by blowing, and this puffing would, therefore, be a disadvantage. Furthermore, when silica is fused in the presence of oxygen in the presence of graphite, carbonaceous gases are formed as well as a suboxide of silica. These gases and vapours may diffuse through the mass causing further reduction and toward the end of the fusion will condense to form a discolored mass of material. While this discolored material may not be a disadvantage in all cases, there are a greater number of cases in which it is necessary to anneal the material or to reheat or remelt it to form other vessels as stated above and in so doing this discoloration is greatly emphasized and may be so objectionable as to render such products unsalable.

As a consequence of my present invention all these difficulties are overcome and a material free from occluded gases is produced which may be reworked without puffing up and may be reheated without discoloration. My invention also eliminates the possibility of losing a large percentage in manufacture of unfinished material, in the form of tubing or rod stock (the "pull") by eliminating the formation of large bubbles in the product which otherwise would be drawn out into very large pipes in the further fabrication of such stock and which might make such tubing or rod stock unusable.

In accordance with my present invention, I have devised an apparatus and a method whereby quartz sand, low grade crystal quartz, or other form of silica, can be converted into substantially clear, vitreous silica in which the cavities are relatively few, small, disconnected and filled with gas at such a low pressure that upon elongation of the product by drawing, the resulting "pipes" are so short that upon reheating they collapse into separate bubbles. Various other features and advantages of my invention will be hereinafter set forth.

My invention, as pointed out in the appended claims, includes the step of fusing quartz while venting gas from the interior of the charge of silica during fusion, and includes also as one of its features a fusion furnace provided with means for withdrawing gas from the interior portions of the fusion, this means conveniently being constituted by ducts leading to the interior of the fusion, and to the resistors of the resistance type furnace. Coalescence proceeds in a charge thus vented without trapping gases and vapours to a harmful extent and greatly reduces the number and size of "pipes" which subsequently may be formed in the pulling process. Although it is not necessary to maintain a vacuum in the fusion chamber, it is possible by control of vacuum to eliminate "pipes" to such extent that the final product, such as drawn tubing or rod, will be practically clear.

An apparatus suitable for carrying out my invention is illustrated in the accompanying drawing in which Fig. 1 is a top view of a resistance furnace, the cover being removed; Fig. 2 is a vertical section of the furnace with a charge in position ready for fusion; and Fig. 3 is a fragmental view showing the beginning of a "pull" for the production of unfinished stock.

The resistance furnace illustrated comprises a sheet metal container 1, which is provided with a removable cover 2, secured to the container by the bolts 3. Within the container is arranged a resistance heater 4, consisting of vertical graphite rods connected in series as shown by horizontal bars of graphite. This heater is supplied with electric current by the terminals 5, 6 passing through the wall of the container and connected to the heater by the links 7, 8. Packed around the resistance heater is a charge 9 consisting either of irregular fragments of quartz crystals or of a coarse form of silica sand. This charge preferably is surrounded by a mass of fine sand 10 which supports and heat insulates the fusion charge. Supported from the framework 12 which consists of angle-irons, is a refractory chute or tube consisting of mortised cylindrical members 13 composed of zirconia, or similar refractory material and a graphite tube 14 suspended therefrom and projecting into the fusion mass 9. The tube 14 acts as a deflector, or die, which causes the delivery of the drawn material from the charge to occur in a regular manner.

A number of conduits, or vent pipes 15 consisting of graphite, or other suitable material, project from the interior of the charge into the space above the fine sand packing 10, and serve for the removal of gases from the charge during fusion. Gases are also removed through a vent pipe 16 which communicates with a graphite nozzle 17 projecting from beneath the fusion charge to a region near the mouth of the die 14. This nozzle acts also as a core to form a tube, as shown in Fig. 3, when material is withdrawn.

Gas also is withdrawn from regions adjoining the cross-bar members of the heater through tubes, one of which is illustrated at 18. Tubes 19 withdraw gas in the neighborhood of the links 7 and 8. Fusion of the silica charge proceeds from the interior toward the exterior of the charge so that trapping of the gases is avoided by sealing of the exterior layer. Through the various vent tubes gases are withdrawn from the interior of the charge before the charge begins to seal over and coalesce.

With the described parts in position the furnace is sealed, evacuation occurs by suitable vacuum pumps connected to the exhaust main 20 and current is supplied to the resistance heater 4. The gas pressure is reduced to about 8 m.m. or less pumping being continued during the fusion period of about eight hours.

The furnace top 2 then is removed and the bait may be raised as shown in Fig. 3 to draw out tubes or rods from the fusion. The bait 21 may consist of tungsten wires 22 over which tubes 23 of silica are held in position. The silica fusion adheres to these silica tubes. Upon raising the bait support 23 the fusion is pulled through the die 14. The baffle plate 25 engages with the vented graphite plug 26, lifting it from position, and thus opening the chute through which the pull of silica rods or tubes is removed from the furnace.

The product is characterized by the substantial freedom from "pipes" and discolorations which makes it more transparent to light than silica melted under less favorable conditions of venting while under vacuum, and in addition the product can be melted more quickly and worked in a flame without puffing by reason of the absence of these cavities and foreign material.

What I claim as new and desire to secure by Letters Patent of the United States, is:

1. The method of producing vitreous silica products from raw silica which consists in subjecting a mass of silica to fusion and venting gases through conduits projecting into the interior of said mass.

2. The method of producing vitreous silica products substantially free from cavities from a mass of raw silica sand which consists in producing a zone of fusion in the interior of the mass of said material, venting gases from said fusion zone and upon the production of a fused mass withdrawing fused material from said fusion zone through a conduit projecting through unfused parts of said mass.

3. The method of producing vitreous silica products from vacuum treated raw silica sand which may be worked in a flame much more rapidly than similar products of material fused under atmospheric conditions, which consists in subjecting a mass of raw silica to a fusion in a vacuum while venting said material of gases and vapors through passages leading to the interior of the mass.

4. The method of producing vitreous silica products which may be worked in a flame with substantially no puffing due to air or gas inclusions in the fused product consisting in confining a mass of fragments of silica in a vacuum, producing a fusion zone in the interior of said mass while the exterior portions remain unfused, venting the fusion zone through passages leading from the interior of the mass to the exterior to evacuate air pockets whereby puffing on reworking in a flame will be reduced, and withdrawing fused material from said fusion zone while excluding unfused material.

5. The method of producing vitreous silica products from raw silica which consists in heating a mass of said raw silica to the fusion point from the interior towards the outside of said mass whereby glazing of the exterior is avoided, venting gases and vapors from the interior of said mass through conduits of refractory material, and finally withdrawing fused material from the mass.

6. An apparatus for fusing refractory materials comprising a sealed container, heating means for fusing a charge of fragmentary refractory material therein, and conduits extending into said charge for removing gas directly from the interior of said charge.

7. A furnace for fusing silica containing gas inclusions which consists of a container for the silica, a resistance heater in said container, means for venting gas directly from the environment of the resistance and means for withdrawing silica from a fusion zone in said container while excluding unfused material.

8. An apparatus for fusing silica containing trapped gases which consists of a container, an electric resistance heater therein constructed to be embedded in a mass of silica fragments, conduits leading through said mass to the resistance heater and communicating with a space external to said mass for withdrawing gases, conduits imbedded in said mass and communicating with said external space for withdrawing gases, means for withdrawing gases from said external space and a chute projecting into said container and being constructed to permit withdrawal of fused material from a fusion zone while excluding unfused material.

9. A fusion furnace comprising a container, electric resistance heaters therein enclosing a fusion space, conduits extending from said resistance heaters to a region remote from said fusion space for venting gas from said heaters and additional gas venting conduits extending from other interior parts of said fusion space to regions remote therefrom for the escape of trapped gas from the interior of a charge placed in said fusion space.

In witness whereof, I have hereunto set my hand this 15th day of May, 1930.

PHILIP K. DEVERS.